United States Patent
Ogawa (10) Patent No.: US 11,209,722 B2
(45) Date of Patent: Dec. 28, 2021

(54) PROJECTION OPTICAL SYSTEM AND IMAGE PROJECTION DEVICE

(71) Applicant: SONY SEMICONDUCTOR SOLUTIONS CORPORATION, Kanagawa (JP)

(72) Inventor: Yusuke Ogawa, Kanagawa (JP)

(73) Assignee: Sony Semiconductor Solutions Corporation, Kanagawa (JP)

( * ) Notice: Subject to any disclaimer, the term of this patent is extended or adjusted under 35 U.S.C. 154(b) by 0 days.

(21) Appl. No.: 16/631,956

(22) PCT Filed: Jul. 10, 2018

(86) PCT No.: PCT/JP2018/025960
§ 371 (c)(1),
(2) Date: Jan. 17, 2020

(87) PCT Pub. No.: WO2019/021805
PCT Pub. Date: Jan. 31, 2019

(65) Prior Publication Data
US 2020/0174349 A1   Jun. 4, 2020

(30) Foreign Application Priority Data

Jul. 24, 2017 (JP) .............................. JP2017-142499

(51) Int. Cl.
*G03B 21/00* (2006.01)
*G03B 21/14* (2006.01)
*G03B 21/20* (2006.01)

(52) U.S. Cl.
CPC ......... *G03B 21/008* (2013.01); *G03B 21/147* (2013.01); *G03B 21/2033* (2013.01)

(58) Field of Classification Search
CPC ...... H04N 9/31–3197; G03B 21/00–64; G02B 27/01–0189;

(Continued)

(56) References Cited

U.S. PATENT DOCUMENTS 6,170,953 B1   1/2001   Lee et al.
2006/0114430 A1*  6/2006   Masubuchi ............ G03B 21/10
                                                    353/99

(Continued)

FOREIGN PATENT DOCUMENTS

JP   S61-090122   5/1986
JP   2009-116163  5/2009

(Continued)

OTHER PUBLICATIONS

International Search Report and Written Opinion prepared by the European Patent Office dated Sep. 21, 2018, for International Application No. PCT/JP2018/025960.

*Primary Examiner* — Toan Ton
*Assistant Examiner* — Christopher A Lamb, II
(74) *Attorney, Agent, or Firm* — Sheridan Ross P.C.

(57) ABSTRACT

The present disclosure relates to a projection optical system and an image projection device capable of projecting a more uniform and brighter image. The image projection device includes a laser light source for outputting a laser beam, a scanning unit for performing scanning with the laser beam two-dimensionally, and an optical component for enlarging a projection angle of view of an image projected by performing the scanning at a predetermined magnification relative to a scanning angle of view of the scanning performed by the scanning unit. The optical component is designed so that a ratio of the magnification for enlargement to change the scanning angle of view into the projection angle of view at an edge part of an image to the magnification for enlargement of view at a central part of the image is greater than 1. The present technique is applicable to laser scanning type image projection devices, for example.

7 Claims, 9 Drawing Sheets

(58) Field of Classification Search
CPC ......... G02B 2027/01–0105; G02B 26/10–108; G02B 27/00–648; G02B 2027/0105–0198
See application file for complete search history.

(56) References Cited

U.S. PATENT DOCUMENTS

| | | | | |
|---|---|---|---|---|
| 2006/0285078 | A1* | 12/2006 | Kasazumi | ............ G02B 26/101 |
| | | | | 353/37 |
| 2010/0302513 | A1 | 12/2010 | Takahashi et al. | |
| 2011/0128602 | A1* | 6/2011 | Hamano | ............ G02B 26/0841 |
| | | | | 359/205.1 |
| 2019/0243228 | A1* | 8/2019 | Hirata | .................. H04N 9/3179 |

FOREIGN PATENT DOCUMENTS

| | | | |
|---|---|---|---|
| JP | 2011-008221 | 1/2011 | |
| WO | WO-2018015991 A1 * | 1/2018 | ............. G06F 3/041 |

* cited by examiner

$\theta i = \theta o + 1 \ (\theta o \leqq 10)$
$\theta i = [1 + (\theta o - 10) \times 0.6/20] (\theta o + 1) \ (\theta i > 10)$

PROJECTION OPTICAL SYSTEM AND IMAGE PROJECTION DEVICE

CROSS REFERENCE TO RELATED APPLICATIONS

This application is a national stage application under 35 U.S.C. 371 and claims the benefit of PCT Application No. PCT/JP2018/025960 having an international filing date of 10 Jul. 2018, which designated the United States, which PCT application claimed the benefit of Japanese Patent Application No. 2017-142499 filed 24 Jul. 2017, the entire disclosures of each of which are incorporated herein by reference.

TECHNICAL FIELD

The present disclosure relates to a projection optical system and an image projection device, and particularly relates to a projection optical system and an image projection device that can project a more uniform and brighter image.

BACKGROUND ART

Conventionally, a laser scanning type image projection device has been developed that projects an image by performing scanning two-dimensionally with a laser beam output from a laser light source with a MEMS mirror manufactured using a MEMS (Micro Electro Mechanical Systems) technology.

In such a laser scanning type image projection device, increasing an angle of view at the time of projecting an image is advantageous for shortening distance for projecting the image or improving the brightness of the image. For example, although the angle of view can be increased by enlarging the swing angle of the MEMS mirror, since the swing angle of the MEMS mirror has a limit in reliability, the angle of view depending on the swing angle of the MEMS mirror has restrictions due to the limit.

Therefore, it is considered to use a method of enlarging the angle of view of the actually projected image, in which the angle of view determined by the swing angle of the MEMS mirror is enlarged by using an optical system such as a lens. However, in a case where the angle of view is enlarged by using an optical system such as a lens, the image of the laser beam at an MEMS mirror position that is a starting point for scanning with the laser beam becomes smaller by a lateral magnification.

Incidentally, in the safety standard IEC60825-1 of the laser product, a proportionality coefficient called C6 value is used for the maximum exposure emission level AEL (Accessible Emission Limit) allowed in each class of the laser product. This C6 value is measured by placing an aperture ($\phi$7 mm) that corresponds to a pupillary orifice and a convex lens that corresponds to a pupil at distance of 100 mm from the position of the MEMS mirror that is the dispersed light source, and by forming an image at an imaging position that is a position of the retina.

For example, the C6 value is a coefficient proportional to a visual angle $\alpha$, and the visual angle $\alpha$ is defined as an angle at which the dispersive light source (laser beam on the MEMS mirror in a case of laser scanning type display) stretches with respect to a pupil. Therefore, the C6 value, namely, the AEL is correlated with the image size of the laser beam on the MEM mirror.

Accordingly, when the image of the laser beam is reduced in size as the angle of view is enlarged by an optical system such as a lens, the AFL is lowered, and as a result, the brightness is limited in accordance with the safety standard. In particular, a resonance operation of the GEMS mirror reduces scanning speed of the laser beam more at an edge part of the projected image than at a central part of the image, so that laser power at the edge part of the image is more limited than at the central part of the image. In other words, since an intensity of light is detected with an aperture ($\phi$7 mm) in accordance with the safety standard, the edge part of the image where the speed is slower is likely to be restricted by the safety standard as a detection intensity increases.

For example, PTL 1 discloses a projection-type liquid crystal display device with safety improved by causing the projection power defined by a full converging angle of a microlens, effective diagonal panel size, and focal length of a projection lens to be lower than a reference value based on a laser beam with a predetermined wave length.

CITATION LIST

Patent Literature

PTL 1 JP 2009-116163A

SUMMARY

Technical Problem

As described above, in the laser scanning type image projection device, in the case where the angle of view of scanning by the MEMS mirror is enlarged by an optical system such as a lens, the laser power is limited to satisfy the safety standard, and as a result, the projected image becomes dark.

The present disclosure has been made in view of such a situation, and enables a more uniform and brighter image to be projected.

Solution to Problem

A projection optical system of an aspect of the present discloser includes an optical component configured to enlarge a projection angle of view of an image projected by a scanning unit that performs scanning two-dimensionally with a laser beam output from a laser light source at a predetermined magnification relative to a scanning angle of view of the scanning performed by the scanning unit. The optical component is designed such that a ratio of a magnification for enlargement to change the scanning angle of view into the projection angle of view at an edge part of the image to a magnification for enlargement to change the scanning angle of view into the projection angle of view at a central part of the image is greater than 1.

An image projection device of an aspect of the present disclosure includes a laser light source for outputting a laser beam; a scanning unit for performing scanning with the laser beam two-dimensionally; and a projection optical system having an optical component that enlarges a projection angle of view of an image projected by performing the scanning with the laser beam two-dimensionally at a predetermined magnification relative to a scanning angle of view of the scanning performed by the scanning unit. The optical component is designed such that a ratio of a magnification for enlargement to change the scanning angle of view into the projection angle of view at an edge part of the image to a magnification for enlargement to change the scanning angle of view into the projection angle of view at the central part of the image is greater than 1.

In one aspect of the present disclosure, a optical component is designed such that a ratio of a magnification for enlargement to change a scanning angle of view into a projection angle of view at an edge part of an image to a magnification for enlargement to change the scanning angle of view into the projection angle of view at a central part of the image is greater than 1.

Advantageous Effect of Invention

According to one aspect of the present disclosure, a more uniform and brighter image can be projected.

Note that the effect is not necessarily limited to the effects described here, and may be any of the effects described in the present disclosure.

DESCRIPTION OF EMBODIMENTS

Hereinafter, a specific embodiment to which the present technology is applied will be described in detail with reference to the drawings.

<Configuration Example of Laser Scanning Type Image Projection Device>

Figure 1:
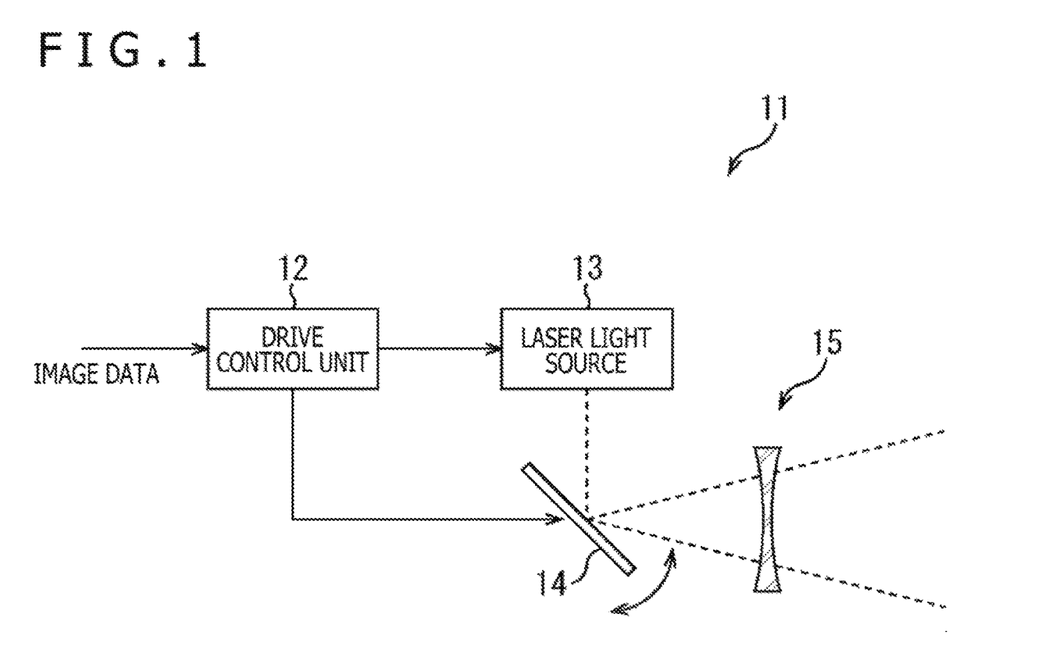
FIG. 1 is a block diagram illustrating a configuration example of as embodiment of a laser scanning type image projection device to which the present technology is applied.

FIG. 1 is a block diagram illustrating a configuration example of an embodiment of a laser scanning type image projection device to which the present technology is applied.

As illustrated in FIG. 1, an image projection device 11 includes a drive control unit 12, a laser light source 13, a MEMS mirror 14, and a projection optical system 15.

The drive control unit 12 controls driving of the laser light source 13 and the MEMS mirror 14 in accordance with image data supplied by reproducing an image by an external reproduction device (not illustrated), and projects the image. For example, the drive control unit 12 controls an emission timing of a laser beam from the laser light source 13 and at the same time controls a scanning timing of the MEMS mirror 14 that performs scanning with the laser beam such that an image according to the image data can be projected.

The laser light source 13 outputs a laser beam in order for the image projection device 11 to project an image. Further, laser power when the laser light source 13 outputs a laser beam can be controlled by the drive control unit 12 in accordance with an angle of view.

The MEMS mirror 14 drives a reflecting surface that reflects the laser beam output from the laser light source 13, and thereby two-dimensionally performing scanning with the laser beam toward a plane perpendicular to the optical axis along which the image projection device 11 projects an image. Note that the angle of scanning with the laser beam performed by the MEMS mirror 14 is hereinafter referred to as a scanning angle of view as appropriate.

Figure 4:
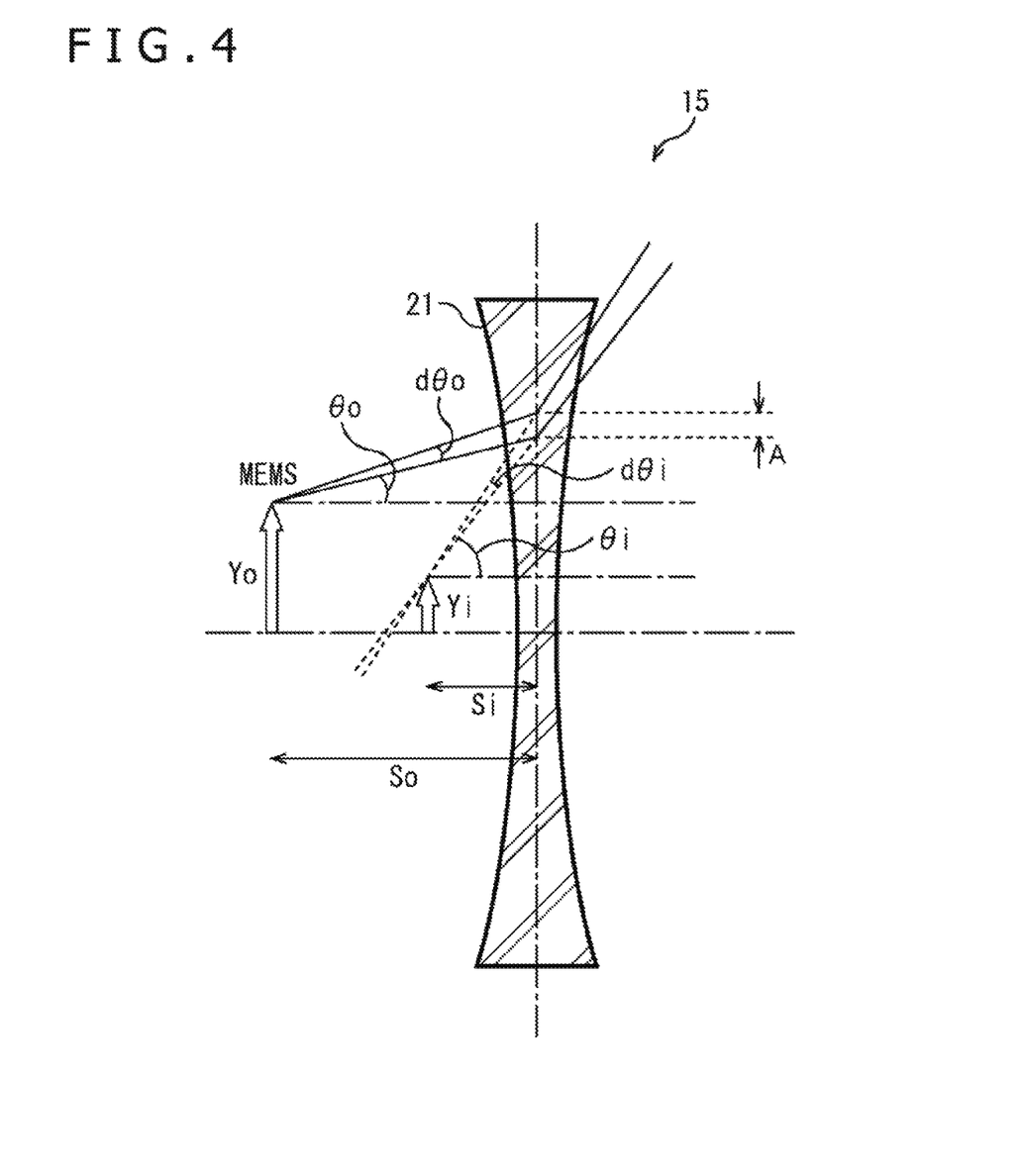
FIG. 4 is a diagram for explaining image formation at an arbitrary angle of view.
Figure 8:
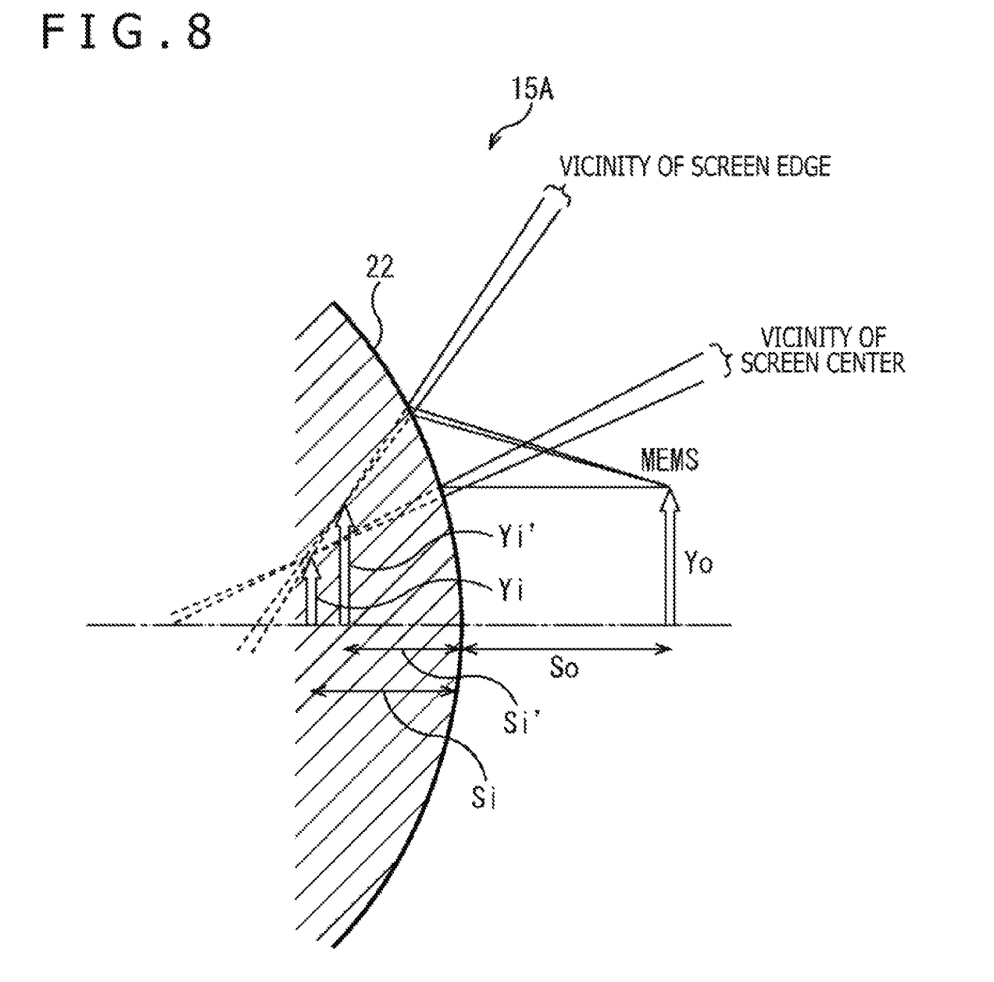
FIG. 8 is a diagram illustrating a first modification of the projection optical system.

The projection optical system 15 is, for example, an optical system having optical components such as a lens 21 to be described later as illustrated in FIG. 4 and a free-form surface mirror 22 to be described later as illustrated in FIG. 8. For example, the projection optical system 15 enlarges the scanning angle of view of scanning with a laser beam performed by the MEMS mirror 14 at a predetermined magnification so that the scanning angle of view becomes the projection angle of view that is the angle of view at which an image is projected by the image projection device 11.

The image projection device 11 is configured in this manner, and the projection optical system 15 that satisfies the safety standards as described above and can avoid a restriction of the laser power is employed. For example, the image projection device 11 employs the projection optical system 15 designed under an optical condition in which a ratio of a magnification at an edge part of the image to the magnification at a central part of the image is greater than 1 regarding the magnification for enlargement to change the scanning angle of view into the projection angle of view, and the magnification increases with distance from the central part toward the edge part of the image.

Thereby, the image projection device 11 can suppress reduction of scanning speed of the laser beam at the edge part of the image, and can increase the laser power at the edge part of the image as compared with the conventional art. Therefore, even when the image projection device 11 satisfies the safety standards described above, a reduction in brightness at the edge part of the image can be avoided and a more uniform and brighter image can be projected.

Figure 2:
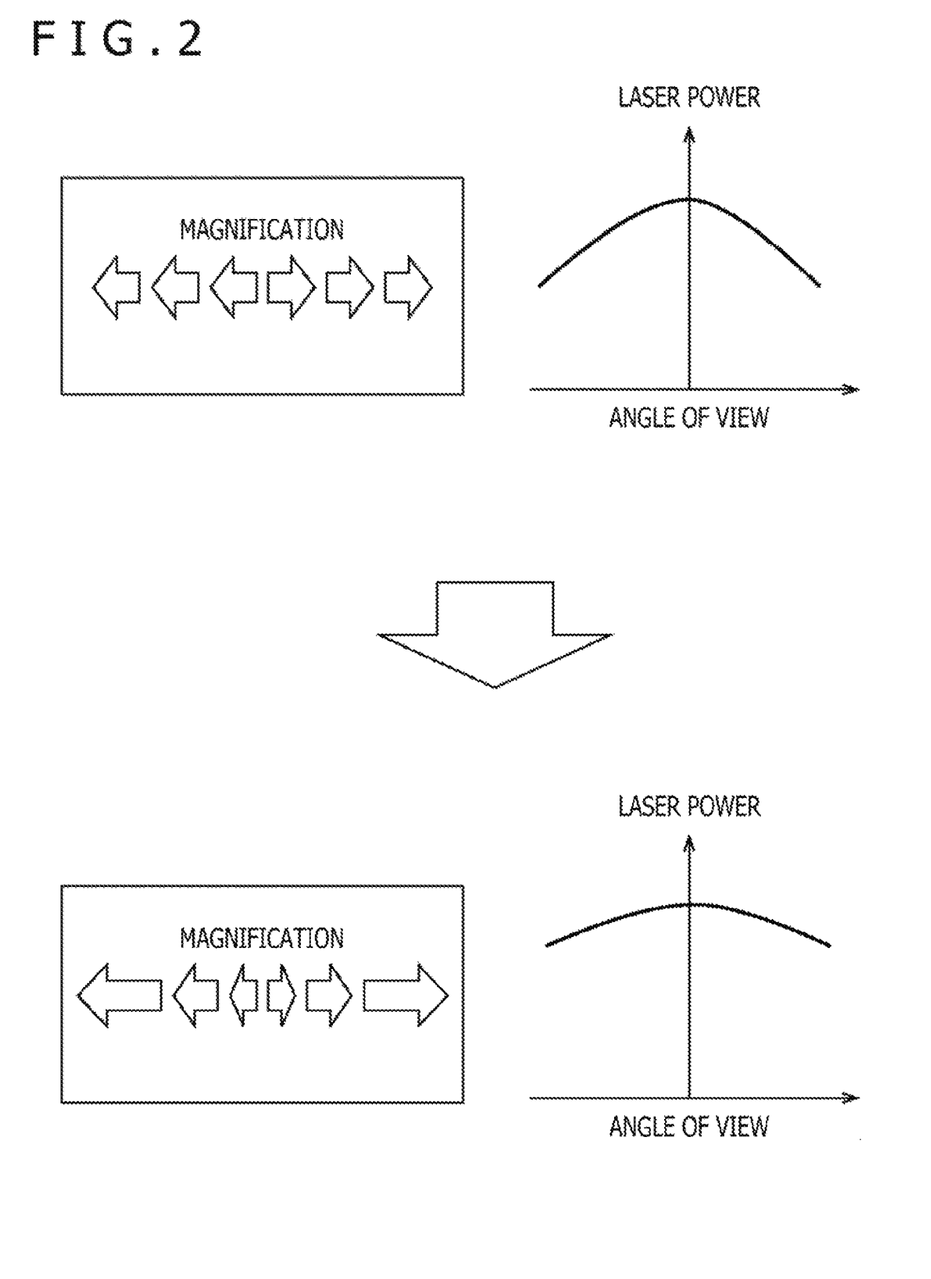
FIG. 2 is a diagram for explaining a relationship between a lateral magnification and laser power.

With reference to FIG. 2, a relationship between a lateral magnification (magnification in a line direction toward both edge parts when scanning with laser beam) and laser power in the image projection device 11 will be described. The upper side of FIG. 2 illustrates a relationship of the laser power to the angle of view in an optical system designed so that the lateral magnification is constant, and the lower side of FIG. 2 illustrates a relationship of the laser power to the angle of view in the optical system designed under the optical conditions as described above.

In general, as described above, as the MEMO mirror 14 resonates, the scanning speed of the laser beam decreases because the laser beam turns back at both edge parts in the line direction at the time of scanning with a laser beam. For this reason, as illustrated in the upper side of FIG. 2, in the optical system designed so that the lateral magnification is constant, a detection intensity of the laser beam at the edge part of the image increases, and as a result, it becomes necessary to suppress the laser power according to a restriction of the AEL. In other words, on the upper side of FIG. 2, the laser power is suppressed more as the laser beam moves from the central part toward the edge part of the image as illustrated by the curve representing the restriction of the laser power by the AEL with respect to the angle of view, and the brightness at the edge part of the image is reduced.

On the other hand, as illustrated in the lower side of FIG. 2, the detection intensity of the laser beam at the edge part of the image can be reduced in an optical system designed under an optical condition in which the ratio of the lateral magnification at the edge part of the image to the lateral magnification at the central part of the image is greater than 1, and the lateral magnification increases with distance from the central part toward the edge part of the image. In other words, in this optical system, since the lateral magnification increases with the decreasing distance from the edge part of the image, a reduction in the speed of the scanning with the laser beam can be suppressed (that is, a reduction in the scanning speed can be avoided) on the edge part side on the projected image compared with an optical system designed so that the lateral magnification is constant.

As a result, in the optical system designed under the optical conditions as described above, when the laser power is suppressed in accordance with the AEL restriction, the degree to which the laser power is suppressed at the edge part of the image can be made lower than before (the AEL can be satisfied even the laser power is increased). In other words, on the lower side of FIG. 2, as illustrated by the curve representing the restriction of the laser power by the AEL with respect to the angle of view, the degree to which the laser power is suppressed is reduced as the laser beam moves from the central part toward the edge part of the image, and the brightness can be prevented from being reduced at the edge part of the image. As described above, since the safety standard is satisfied and the laser power can be prevented from being limited, the image projection device 11 can project a more uniform and brighter image without reducing the brightness at the edge part of the image.

In addition, it is assumed that distortion occurs in the image by changing the lateral magnification in the screen, but this distortion can be corrected by controlling the emission timing of the laser beam when projecting the image, and therefore, the image projection device 11 can project an image without distortion. For example, the image projection device 11 can project an image without distortion by recognizing distortion occurring in an image in accordance with the characteristics that changes the lateral magnification in the screen, and by performing correction in advance so as to generate reverse distortion that prevents distortion from occurring in the image.

Thus, the image projection device 11 can employ the projection optical system 15 designed under an optical condition in which the ratio of the lateral magnification at the edge part of the image to the lateral magnification at the central part of the image is larger than 1, and the lateral magnification increases with distance from the central part toward the edge part of the image. Thereby, the image projection device 11 can project an image that is more uniform and brighter than the conventional one, while preventing the brightness from being limited at the edge part of the image.

<Configuration Example of Projection Optical System>

Figure 3:
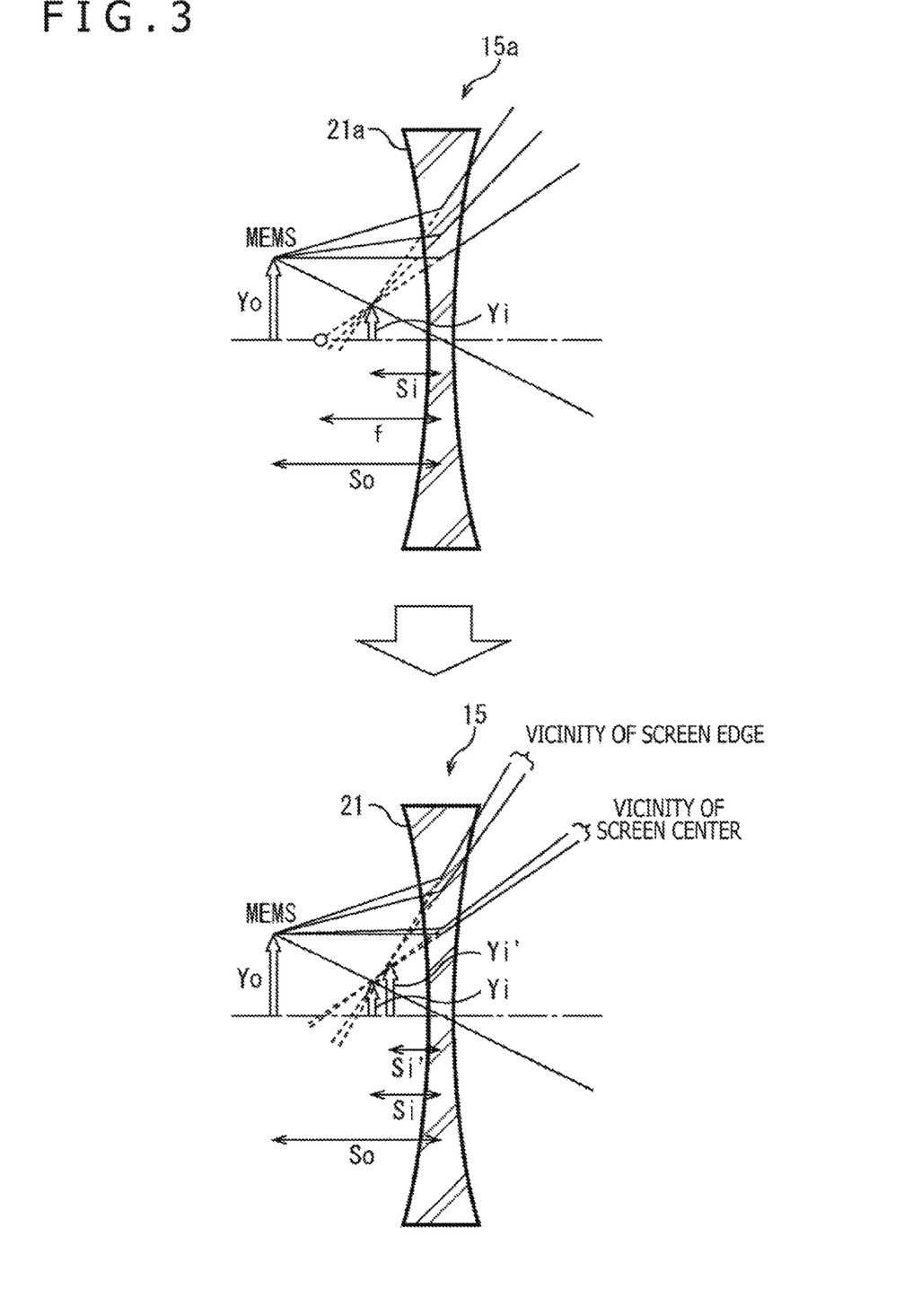
FIG. 3 is a diagram for explaining a projection optical system of a laser scanning type image projection device.

With reference to FIGS. 3 and 4, the projection optical system 15 designed under an optical condition in which the ratio of the lateral magnification at the edge part of the image to the lateral magnification at the central part of the image is greater than 1, and the lateral magnification increases with distance from the central part toward the edge part of the image will be described.

A conventional optical system 15a having a constant lateral magnification is illustrated on the upper side of FIG. 3, and the projection optical system 15 designed under the optical conditions as described above is illustrated on the lower side of FIG. 3.

A negative lens 21a used in the conventional optical system 15a illustrated on the upper side of FIG. 3 is designed so that the lateral magnification is constant. As a result, in the optical system 15a, when the angle of view is enlarged, the image Yi is formed at distance Si from a principal plane of the lens 21a at all the angles of view with respect to an image Yo of the laser beam on the MEMS mirror 14 disposed at distance So from the principal plane of the lens 21a. Therefore, by the optical system 15a, the image of the laser beam is reduced is size by the lateral magnification. MT (=Yi/Yo).

On the other hand, the negative lens 21 used in the projection optical system 15 employed by the image projection device 11 illustrated on the lower side of FIG. 3 is designed so that the lateral magnification is different depending on the angle of view, in other words, the lateral magnification increases with distance from the central part toward the edge part of the image. In other words, the transmissive surface of the lens 21 is formed in a free-form surface shape that satisfies such optical conditions.

As a result, in the central part (vicinity of the center) of the image where the angle of view is small, the small image Yi is formed at distance Si from the principal plane of the lens 21, whereas the edge part (vicinity of the edge) of the image where the angle of view is large, a large image Yi' is formed at distance Si' from the principal plane of the lens 21. In other words, in the lens 21, the real image becomes smaller as the angle of view becomes smaller, whereas the real image becomes larger as the angle of view becomes larger.

The negative lens 21 used in the projection optical system 15 will be described more specifically with reference to FIG. 4.

FIG. 4 illustrates a state of image formation at a certain angle of view θo. As illustrated in the figure, laser beams emitted at an angle of view θo and an angle of view θo+dθo that is minutely changed from the angle of view θo is enlarged by the lens 21, so that the angles thereof become an angle of view θi and an angle of view θi+dθi, respectively. An image forming point at this time is a point where the light beam having the angle of view θi and the light beam having the angle of view θi+dθi intersect when being extended (that is, a tip point of the image Yi).

Here, the lateral magnification MT is expressed by the following equation (1).

[Math. 1]

$$MT = \frac{Yi}{Yo} \qquad (1)$$
$$= \frac{Yo + So \cdot \tan\theta o - Si \cdot \tan\theta i}{Yo}$$

On the other hand, in the plane of FIG. 4, the distance A on the principal plane of the concave lens 21 between the laser beam emitted in a direction of the angle of view θo from a tip point of the image Yo and the laser beam emitted in a direction of a slightly displaced angle of view θo+dθo is focused on, and the distance A is expressed by the following equation (2).

[Math. 2]

$$A = [\tan(\theta i + \partial \theta i) - \tan \theta i] Si = [\tan(\theta o + \partial \theta o) - \tan \theta o] So \quad (2)$$

Accordingly, when the distance Si in an optical axis direction from the principal plane of the lens 21 to the image Yi is obtained on the basis of equation (2) and is input to equation (1), the lateral magnification MT is expressed by the following equation (3).

[Math. 3]

$$MT = 1 + \frac{So}{Yo}\left[\tan\theta o - \frac{\tan(\theta o + \partial \theta o) - \tan\theta o}{\tan(\theta i + \partial \theta i) - \tan\theta i}\tan\theta i\right] \quad (3)$$

Thus, when the image Yo and the distance So are specified, the lateral magnification MT becomes a value according to the angle of view θo and the angle of view θi. Then, as illustrated in FIGS. 5 to 7, in a case where the angle of view θo and the angle of view θi are in a specific relationship, the lateral magnification MT is a value that changes in accordance with the angle of view θo.

Figure 5:
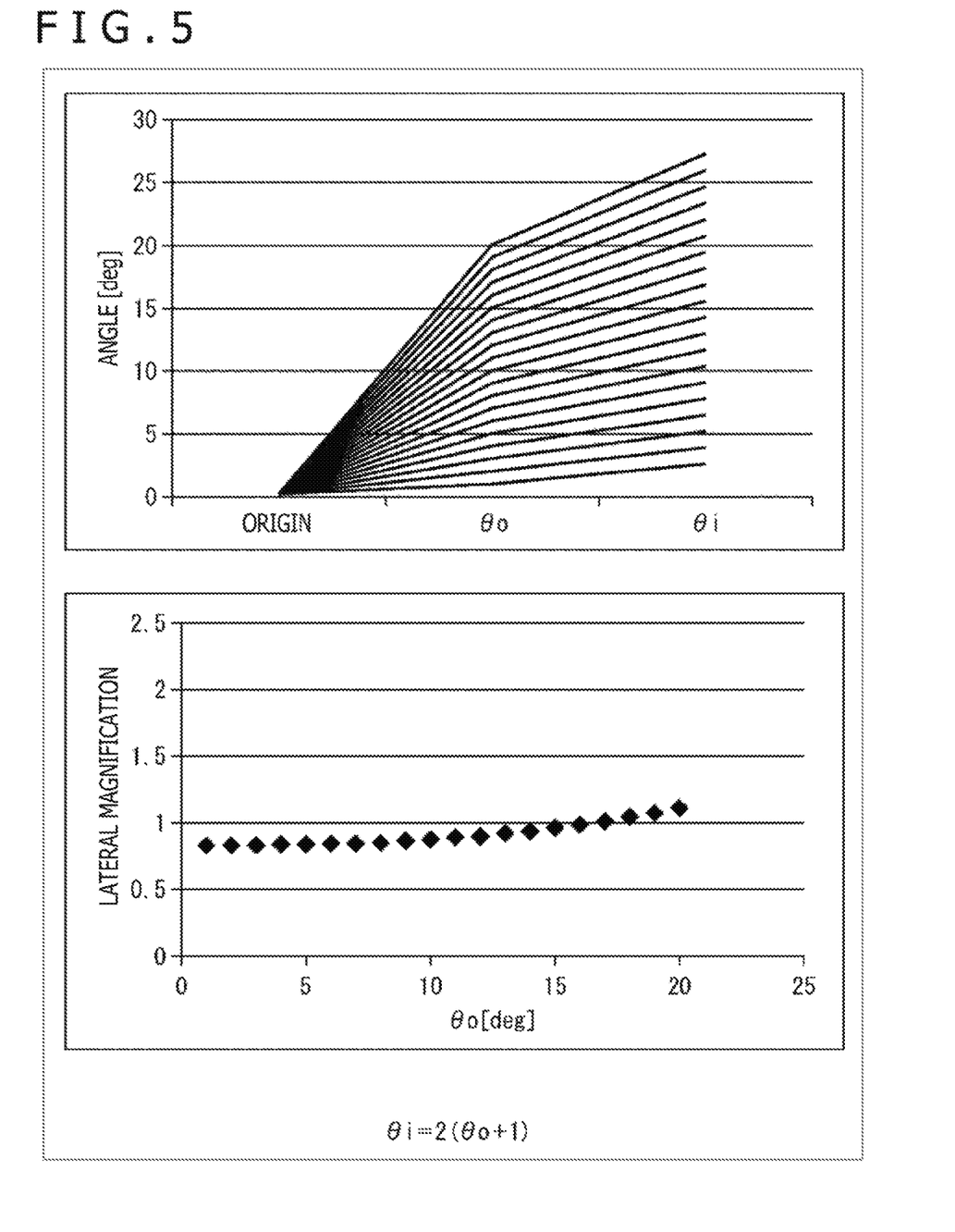
FIG. 5 is a diagram illustrating a first example of a relationship between angles of view and the lateral magnification.
Figure 6:
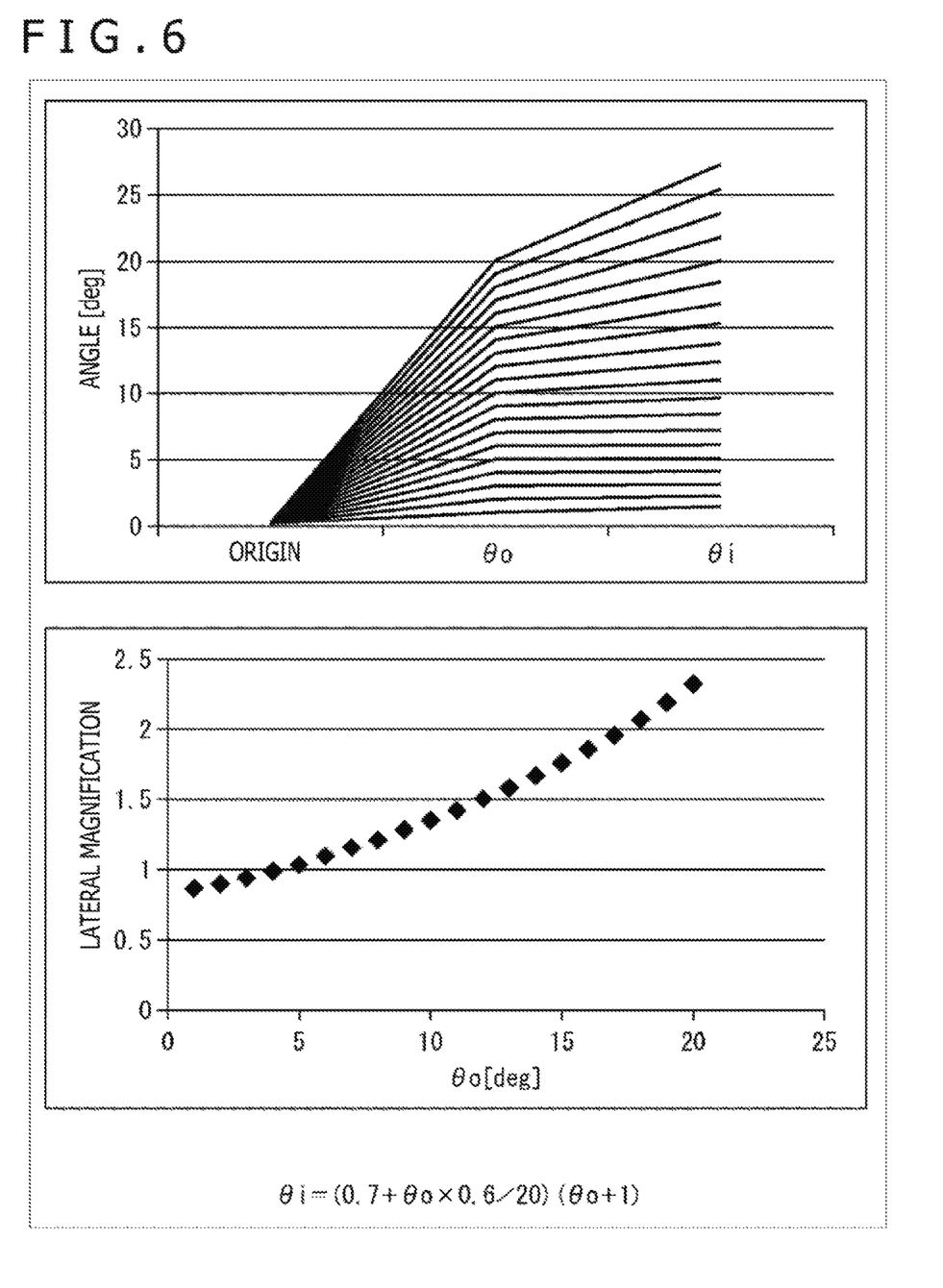
FIG. 6 is a diagram illustrating a second example of the relationship between the angles of view and the lateral magnification.
Figure 7:
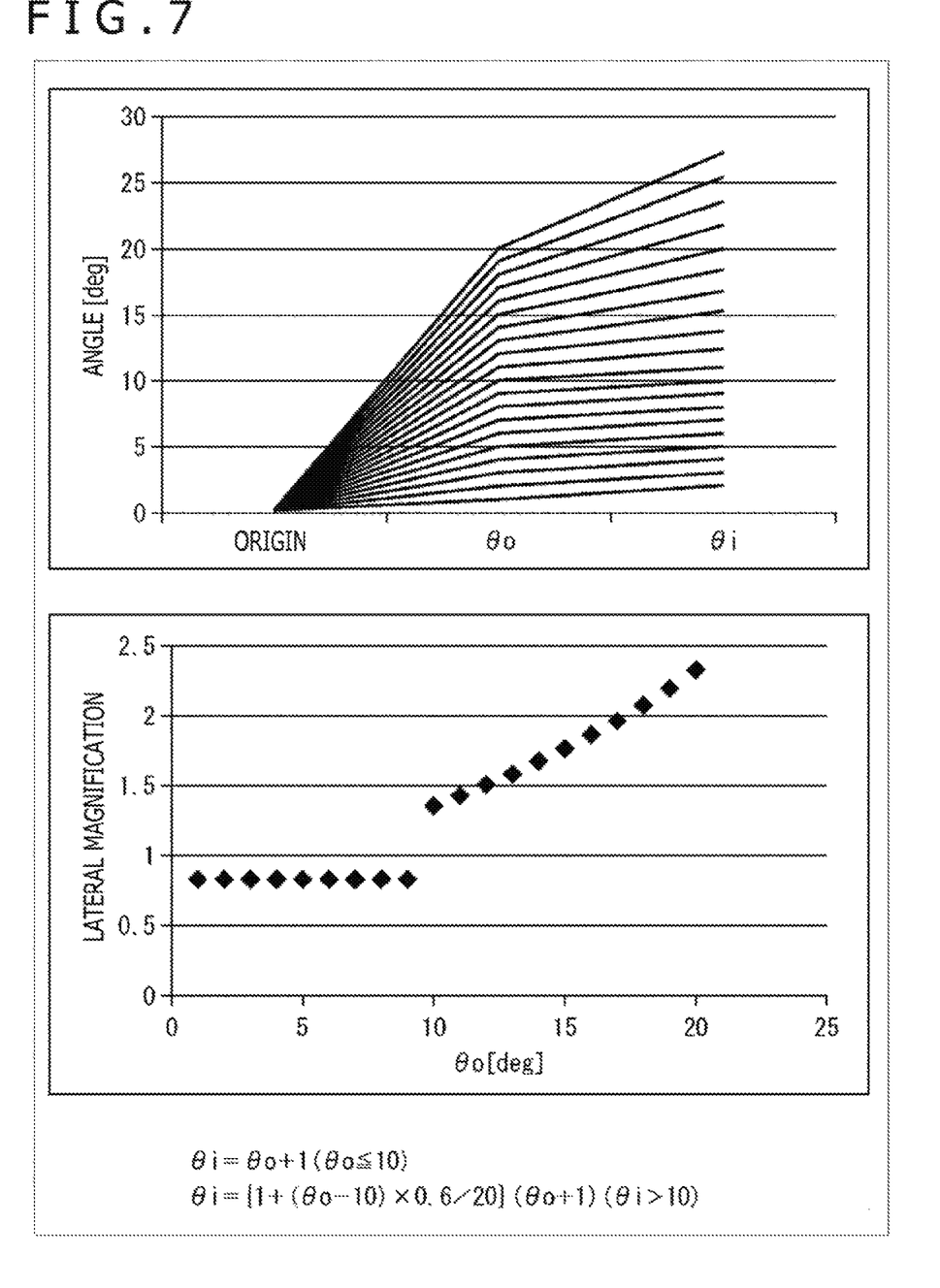
FIG. 7 is a diagram illustrating a third example of the relationship between the angles of view and the lateral magnification.

FIGS. 5 to 7 illustrate examples of a relationship between the angle of view θ0 and the lateral magnification MT when a maximum angle of view is enlarged to 1.365 times.

In the first example illustrated in FIG. 5, a relationship between the angle of view θo and the angle of view θi is represented by θi=2 (θo+1). Therefore, as illustrated in the upper side of FIG. 5, the lens 21 is designed so that the lateral magnifications at the angle of view θo and the angle of view θi at each angle are equal. When a relationship between the laser beam image Yo on the MEMS mirror 14 and the distance So from the principal plane of the lens 21 to the image Yo is represented by So/Yo=10, the lateral magnification increases gradually with the decreasing distance from the edge part of the image as illustrated in the lower side of FIG. 5. For example, when the angle of view θo is 20 degrees, the lateral magnification is approximately 34%.

In the second example illustrated in FIG. 6, the relationship between the angle of view θo and the angle of view θi is represented by θi=(0.7+θo×0.6/20) (θo+1). Accordingly, as illustrated in the upper side of FIG. 6, the lens 21 is designed to have a lateral magnification that increases with distance from the central part toward the edge part of the image (that is, as the angle becomes larger, the spacing of the angle of view θi for each angle becomes larger). Then, as illustrated in the lower side of FIG. 6, the lateral magnification greatly increases with the decreasing distance from the edge part of the image, and, for example, when the angle of view θo is 20 degrees, the lateral magnification is approximately 2.2 times.

In the third example illustrated in FIG. 7, the relationship between the angle of view θo and the angle of view θi is represented by θi=θo+1 in a case where the angle of view θi is 10 or less, and represented by θi=(1+(θo−10)×0.6/20) (θo+1) in a case where the angle of view θi is greater than 10. Accordingly, as illustrated in the upper side of FIG. 7, the lens 21 is designed so that the lateral magnification at the central part of the image (θi≤10) is substantially constant, and the lateral magnification increases greatly with the decreasing distance from the edge part of the image (θi>10). Accordingly, as illustrated in the lower side of FIG. 7, the lateral magnification at the central part of the image is substantially constant, and the lateral magnification increases with the decreasing distance from the edge at the edge part of the image, and, for example, when the angle of view θo is 20 degrees, the lateral magnification is approximately 2.8 times.

As illustrated in FIGS. 6 and 7, by employing the lens 21 designed so that the lateral magnification increases with distance from the central part toward the edge part of the image, the projection optical system 15 can prevent laser power from being suppressed at the edge part of the image.

<Modification of Projection Optical System>

FIG. 8 illustrates a first modification of the projection optical system 15.

A projection optical system 15A illustrated in FIG. 8 is configured to enlarge the image Yo of the laser beam on the MEMS mirror 14 using the convex free-form surface mirror 22.

Similarly to the concave lens 21 described above illustrated in FIG. 4, the reflecting surface of the free-form surface mirror 22 is designed so as to be in an aspherical free-form surface shape so that the lateral magnification varies depending on the angle of view, in other words, the lateral magnification increases with distance from the central part toward the edge part of the image. Thereby, similarly to the projection optical system 15 described above, the projection optical system 15A is designed under an optical condition such that the ratio of the magnification at the edge part of the image to the magnification at the central part of the image is larger than 1 with regard to the magnification at which the scanning angle of view is enlarged to change into the projection angle of view, and the magnification increases with distance from the central part toward the edge part of the image.

Therefore, the image projection device 11 can suppress the reduction of the laser power in the vicinity of the edge of the image by employing the projection optical system 15A, and can project a more uniform and brighter image than before.

Figure 9:
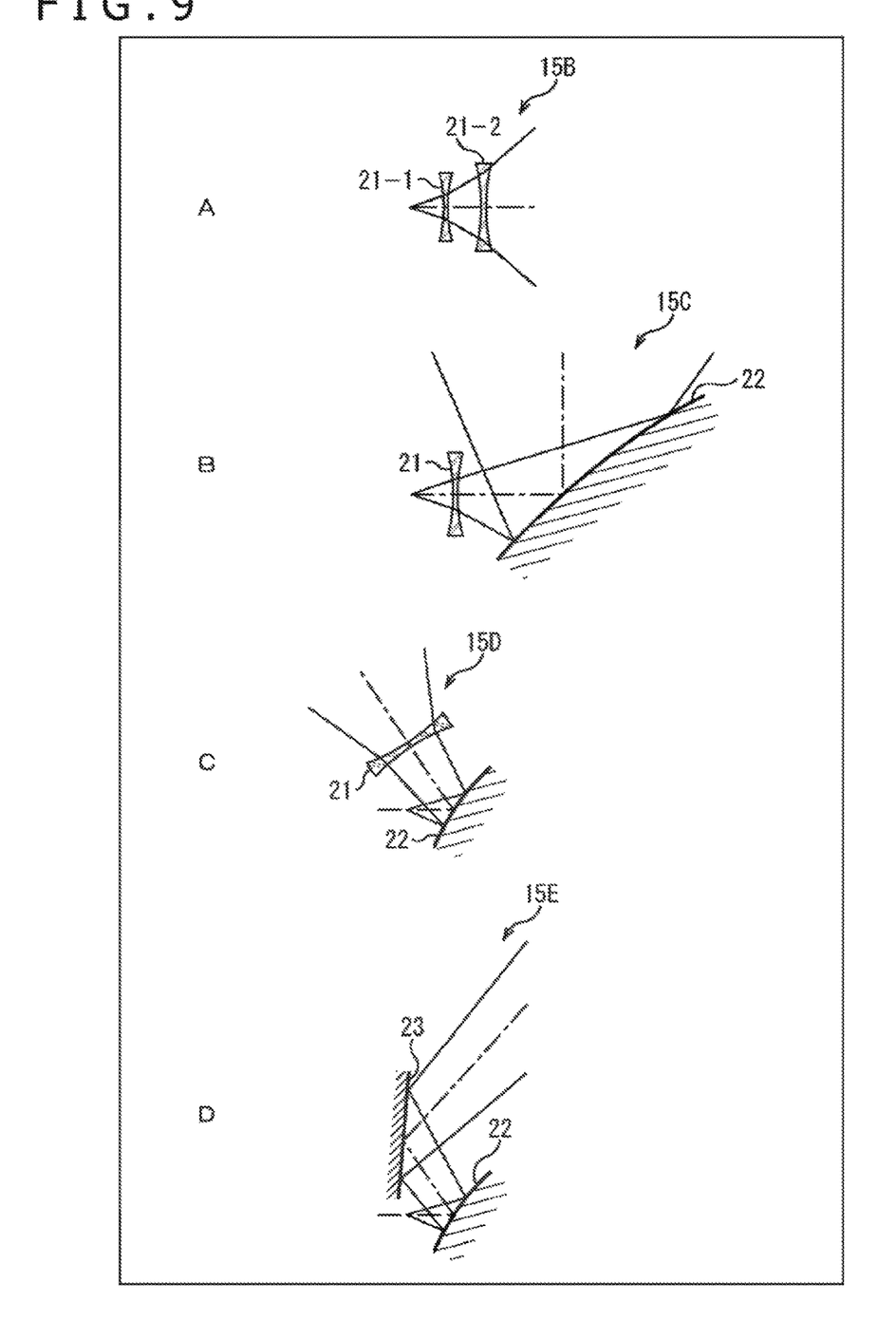
FIG. 9 depicts diagrams illustrating second to fifth modifications of the projection optical system.

With reference to FIG. 9, another modification of the projection optical system 15 will be described.

A of FIG. 9 illustrates a second modification of the projection optical system 15.

As illustrated in A of FIG. 9, a projection optical system 15B is configured to enlarge the image Yo of the laser beam on the MEMS mirror 14 using two lenses 21-1 and 21-2, similarly to the lens 21 in FIG. 4 described above. As a matter of course, two or more lenses 21 may be used. As illustrated in the figure, the projection optical system 15B in which the angle of view enlarged by the lens 21-1 is further enlarged by the lens 21-2 is designed under the optical conditions as described above, whereby the image projection device 11 can project a more uniform and brighter image.

B of FIG. 9 illustrates a third modification of the projection optical system 15.

As illustrated in B of FIG. 9, a projection optical system 15C is configured by using the lens 21 and the free-form surface mirror 22 to enlarge the image Yo of the laser beam on the MEMS mirror 14 in a similar manner as the lens 21 in FIG. 4 described above. As illustrated in the figure, the projection optical system 15C having a configuration in which the angle of view enlarged by the lens 21 is further enlarged by the free-form surface mirror 22 is designed under the optical conditions as described above, whereby the image projection device 11 can project a more uniform and brighter image.

C of FIG. 9 illustrates a fourth modification of the projection optical system 15.

As illustrated in C of FIG. 9, a projection optical system 15D is configured by using the free-form surface mirror 22 and the lens 21 to enlarge the image Yo of the laser beam on the MEMS mirror 14 in a similar manner as the lens 21 in FIG. 4 described above. As illustrated in the figure, the projection optical system 15D having a configuration in which the angle of view enlarged by the free-form surface mirror 22 is further enlarged by the lens 21 is designed under the optical conditions as described above, whereby the image projection device 11 can project a more uniform and brighter image.

D of FIG. 9 illustrates a fifth modification of the projection optical system 15.

As illustrated in D of FIG. 9, a projection optical system 15E is configured by using the free-form surface mirror 22 and a mirror 23 to enlarge the image Yo of the laser beam on the MEMS mirror 14 in a similar manner as the lens 21 in FIG. 4 described above. As illustrated is the figure, the projection optical system 15E configured to reflect with the mirror 23 a laser beam having the angle of view enlarged by the free-form surface mirror 22 is designed under the optical conditions as described above, whereby the image projection device 11 can project a more uniform and brighter image.

As described above, the image projection device 11 may employ the projection optical system 15 of each form as described above, and may employ a combination of various optical components such as lenses and mirrors.

<Combination Example of Configurations>

In addition, the present technique can also employ the following structures.

(1)

A projection optical system including:

an optical component configured to enlarge a projection angle of view of an image projected by a scanning unit that performs scanning two-dimensionally with a laser beam output from a laser light source at a predetermined magnification relative to a scanning angle of view of the scanning performed by the scanning unit, in which the optical component is designed such that a ratio of a magnification for enlargement to change the scanning angle of view into the projection angle of view at an edge part of the image to a magnification for enlargement to change the scanning angle of view into the projection angle of view at a central part of the image is greater than 1.

(2)

The projection optical system described in the above item (1), in which the optical component is designed such that the magnification increases with distance from the central part toward the edge part of the image.

(3)

The projection optical system described in the above item (1) or (2), in which the optical component is designed such that a ratio of the magnification at both edge parts of the image to the magnification at the central part of the image is greater than 1 with respect to the magnification in a line direction in which the scanning with the laser beam is performed, and the magnification increases with distance from the central part toward the both edge parts of the image.

(4)

The projection optical system described in any one of the above items (1) to (3), in which the optical component includes at least one lens having a transmissive surface formed in a free-form surface shape.

(5)

The projection optical system described in any one of the above items (1) to (4), in which the optical component includes at least one mirror having a reflecting surface formed in a free-form surface shape.

(6)

The projection optical system described in any one of the above items (1) to (5), in which the optical component is configured by combining at least one lens having a transmissive surface formed in a free-form surface shape and at least one mirror having a reflecting surface formed in a free-form surface shape.

(7)

An image projection device including:

a laser light source for outputting a laser beam;

a scanning unit for performing scanning with the laser beam two-dimensionally; and a projection optical system having an optical component that enlarges a projection angle of view of an image projected by performing the scanning with the laser beam two-dimensionally at a predetermined magnification relative to a scanning angle of view of the scanning performed by the scanning unit, in which the optical component is designed such that a ratio of a magnification for enlargement to change the scanning angle of view into the projection angle of view at an edge part of the image to a magnification for enlargement to change the scanning angle of view into the projection angle of view at the central part of the image is greater than 1.

(8)

The image projection device described in the above item (7), further including:

a drive control unit that corrects in advance distortion assumed to occur in the image due to the projection optical system, by controlling an emission timing of the laser beam.

Note that the present embodiment is not limited to the above-described embodiment, and various modifications can be made without departing from the scope of the present disclosure. Further, the effect described in the present specification is an example, and the effect of the present disclosure is not limited thereto, and other effects may exist.

[Reference Signs List]

11 Image projection device, 12 Drive control unit, 13 Laser light source, 14 MEMS mirror, 15 Projection optical system, 21 Lens, 22 Free-form surface mirror, 23 Mirror

What is claimed is:

1. A projection optical system, comprising:
an optical component configured to enlarge a projection angle of view of an image projected by a scanner that performs scanning two-dimensionally with a laser beam output from a laser light source at a predetermined magnification relative to a scanning angle of view of the scanning performed by the scanner,
wherein the optical component is designed such that a ratio of a magnification for enlargement to change the scanning angle of view into the projection angle of view at an edge part of the image to a magnification for enlargement to change the scanning angle of view into the projection angle of view at a central part of the image is greater than 1, and
wherein the optical component includes two dual concave lenses each having a transmissive surface formed in a free-form surface shape.

2. The projection optical system according to claim 1, wherein the optical component is designed such that the magnification increases with distance from the central part toward the edge part of the image.

3. The projection optical system according to claim 1, wherein the optical component is designed such that a ratio of the magnification at both edge parts of the image in a horizontal direction to the magnification at the central part of the image is greater than 1 with respect to the magnification in a line direction in which the scanning with the laser beam is performed, and the magnification increases with distance from the central part toward the both edge parts of the image.

4. An image projection device, comprising:
   a laser light source for outputting a laser beam;
   a scanner for performing scanning with the laser beam two-dimensionally; and
   a projection optical system having an optical component that enlarges a projection angle of view of an image projected by performing the scanning with the laser beam two-dimensionally at a predetermined magnification relative to a scanning angle of view of the scanning performed by the scanner,
   wherein the optical component is designed such that a ratio of a magnification for enlargement to change the scanning angle of view into the projection angle of view at an edge part of the image to a magnification for enlargement to change the scanning angle of view into the projection angle of view at the central part of the image is greater than 1, and
   wherein the optical component includes two dual concave lenses each having a transmissive surface formed in a free-form surface shape.

5. The image projection device according to claim 4, further comprising:
   a controller that corrects in advance distortion assumed to occur in the image due to the projection optical system, by controlling an emission timing of the laser beam.

6. The image projection device according to claim 4, wherein the optical component is designed such that the magnification increases with distance from the central part toward the edge part of the image.

7. The image projection device according to claim 4, wherein the optical component is designed such that a ratio of the magnification at both edge parts of the image in a horizontal direction to the magnification at the central part of the image is greater than 1 with respect to the magnification in a line direction in which the scanning with the laser beam is performed, and the magnification increases with distance from the central part toward the both edge parts of the image.

* * * * *